United States Patent
Rohn

[11] 3,785,079
[45] Jan. 15, 1974

[54] DEEP TROLLING REEL WITH TEMPERATURE MONITORING CAPABILITY

[76] Inventor: William C. Rohn, P.O. Box 288, St. Joseph, Mich. 49085

[22] Filed: Oct. 20, 1972

[21] Appl. No.: 299,584

[52] U.S. Cl.............. 43/4, 43/43.12, 242/84.5 R, 242/99, 242/106
[51] Int. Cl.............................................. A01k 89/00
[58] Field of Search........................... 43/43.12, 4; 242/84.5 R, 99, 106

[56] References Cited
UNITED STATES PATENTS
3,614,016  10/1971  Rieth .............................. 242/106
3,719,331  3/1973   Harsch............................ 242/106
3,031,788  5/1962   Shannon ............................ 43/4
3,628,274  12/1971  Wojahn............................ 43/43.12

Primary Examiner—Louis G. Mancene
Assistant Examiner—Daniel J. Leach
Attorney—B. P. Fishburne, Jr.

[57] ABSTRACT

A reel for deep trolling utilizes a coaxial electrical cable as the bait positioning line in conjunction with a shielded thermistor which is connected mechanically and electrically to the cable near its weighted end. The provision of slip rings and a simple phone jack on the reel mounting bracket enables monitoring of one or more reels by means of a single thermocline meter. The reel additionally features a positive pin lock and a convenient adjustable friction brake or drag. The length of cable payed out from the reel is conveniently measured by counting reel revolutions. Other convenience features are included.

12 Claims, 9 Drawing Figures

PATENTED JAN 15 1974 3,785,079

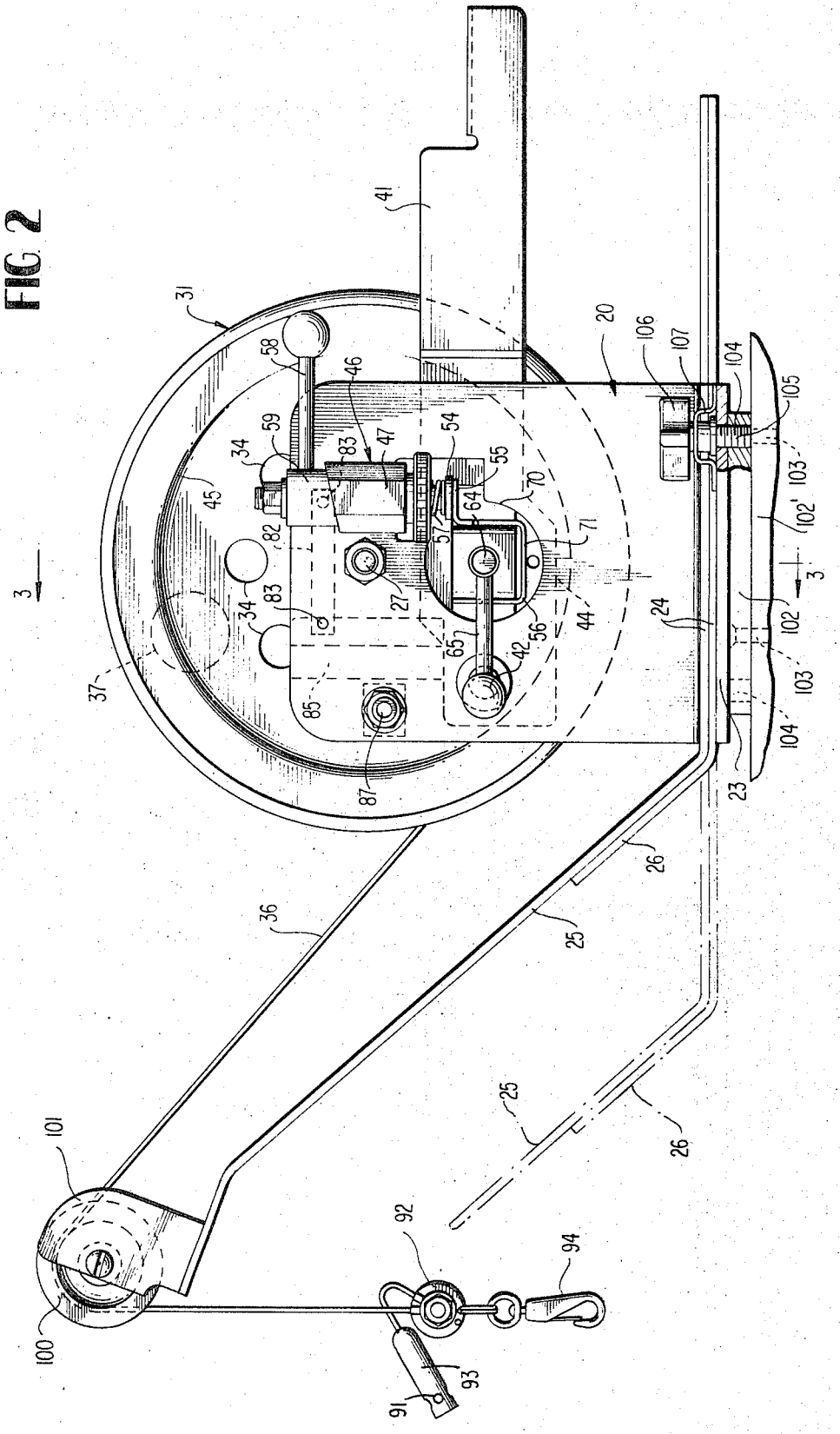

PATENTED JAN 15 1974
3,785,079
SHEET 3 OF 3
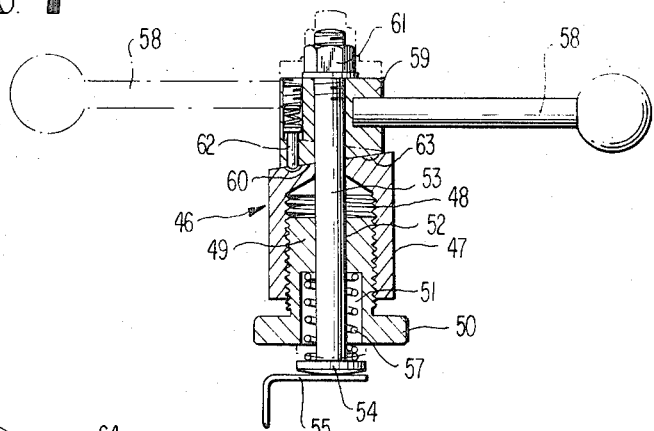
FIG. 7
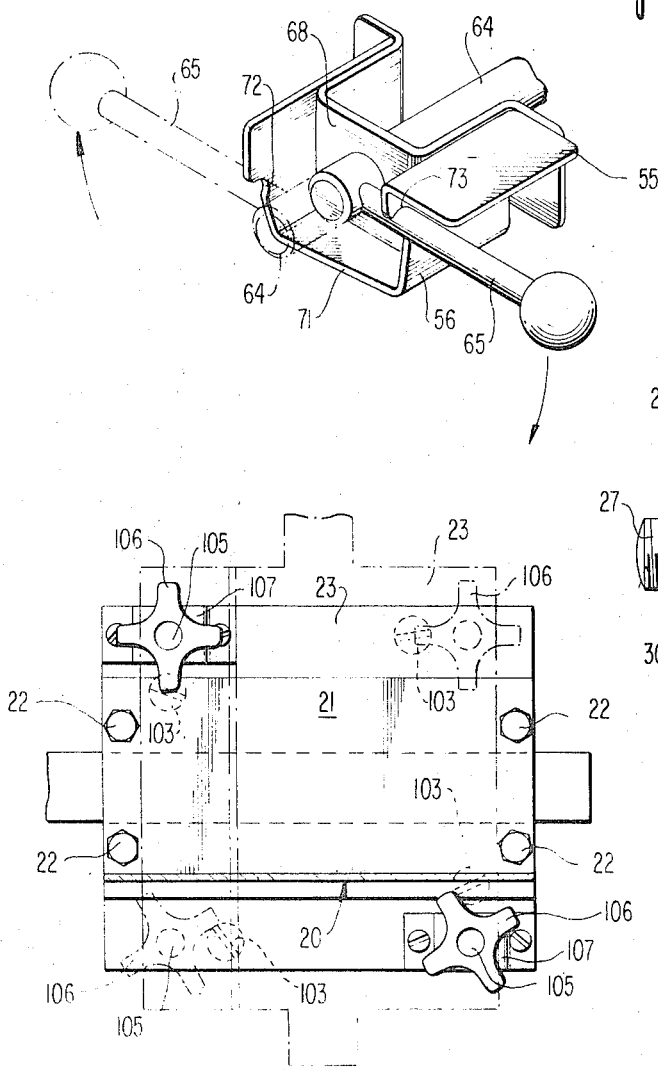
FIG. 8
FIG. 9
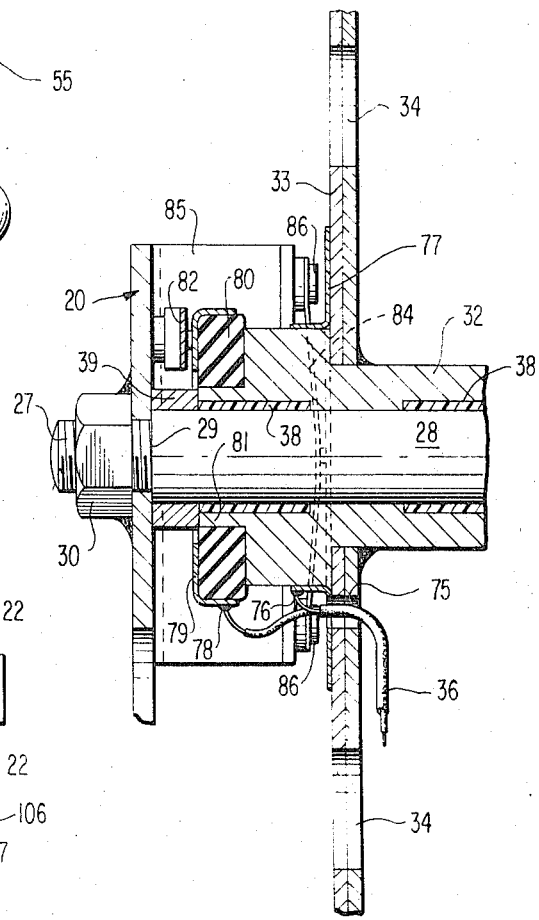
FIG. 4

DEEP TROLLING REEL WITH TEMPERATURE MONITORING CAPABILITY

BACKGROUND OF THE INVENTION

The prior art contains several relatively recent teachings of devices for use in deep trolling, including electrical means for monitoring the temperature of the water in which the lure or bait is moving at any given time. Two such prior art systems are disclosed by U.S. Pat. Nos. 3,031,788, Shannon, and 3,628,274, Wojahn. Each of these patents discloses the concept of positioning a trolling bait by means of an electrical cable carrying a thermally-sensitive resistor or thermistor near its weighted end. The Shannon patent discloses a reel for the electrical cable fishing line which embodies a slip ring structure, Wheatstone bridge, and an extremely sensitive meter for measuring the very minute current values representative of temperatures in the thermocline layer associated with such bridge circuits. The Wojahn patent discloses a system similar to Shannon and additionally shows the use of a separate conventional fishing line which is clipped detachably to the weight means on the electrical cable leading from the bait positioning reel having an integrated temperature measuring meter.

One inherent problem common to the Shannon and Wojahn devices, in addition to their being rather complex, is the lack of provision for electrically coupling additional bait positioning reels to the meter means so that the latter may be used selectively with a number of bait positioning reels. This is one of the main features of the present invention imparting thereto a new and important capability. The provision of a series circuit in the present invention and the utilization of the full current flowing in this circuit in conjunction with the milliammeter renders the above feature feasible and practical. This would be difficult, if not impossible, to achieve with the mentioned prior art due to the extremely minute currents involved and therefore the percentage of error likely to be encountered.

Another prior art patent, namely U.S. Pat. No. 3,614,016, Rieth, shows a reel for positioning a bait or lure in deep trolling operations. It is also the object of the present invention to materially improve upon the device shown in the Rieth patent by the provision of a deep trolling reel which has many structural and functional features not to be found in the Rieth patented reel.

SUMMARY OF THE INVENTION

In essence, the invention provides a reel for deep trolling which enables the fisherman to accurately position a baited line at any desired temperature and to continually monitor the temperature of the water and to change or relocate the bait in terms of temperature at any desired time by use of the reel. The reel features the use of a coaxial cable to which a weight and a shielded thermistor are attached. A separate conventional fishing line is clipped releasably to the bait positioning weight so that when the fish strikes the bait, the fishing line will readily separate from the weighted cable and none of the fighting action and thrill connected with the sport of fishing is lost.

The reel, according to the invention, possesses slip rings, a variable resistance and a simple phone jack whereby the electrical cable carrying the thermistor may be releasably connected with an entirely separate or remote thermocline meter to facilitate water temperature monitoring. This arrangement allows a single thermocline meter to service selectively a large number of the deep trolling reels as may be found desirable and practical.

The reel additionally features a unique friction brake means which may be operated either by hand pressure on a control lever or with an adjustable drag control device which may be preset to the desired tension and left unattended while the weighted cable is descending in the water. The reel also has a positive locking pin which is easily operated by a cam-type control.

Other improvement features and advantages of the invention over the prior art will become apparent during the course of the following detailed description.

BRIEF DESCRIPTION OF DRAWING FIGURES

FIG. 2 is an enlarged side elevation of the reel.

FIG. 4 is an enlarged fragmentary central vertical section at the center portion of the reel particularly illustrating contact and slip rings and associated components.

FIG. 7 is an enlarged fragmentary vertical section through a drag control device on the reel.

FIG. 8 is a fragmentary perspective view of cam control means for a positive locking pin with which the reel is equipped.

FIG. 9 is a plan view, partly in section, of a base mounting means for the reel showing in solid and phantom lines alternate mounting positions of any of four quadrants.

DETAILED DESCRIPTION

Figure 1:
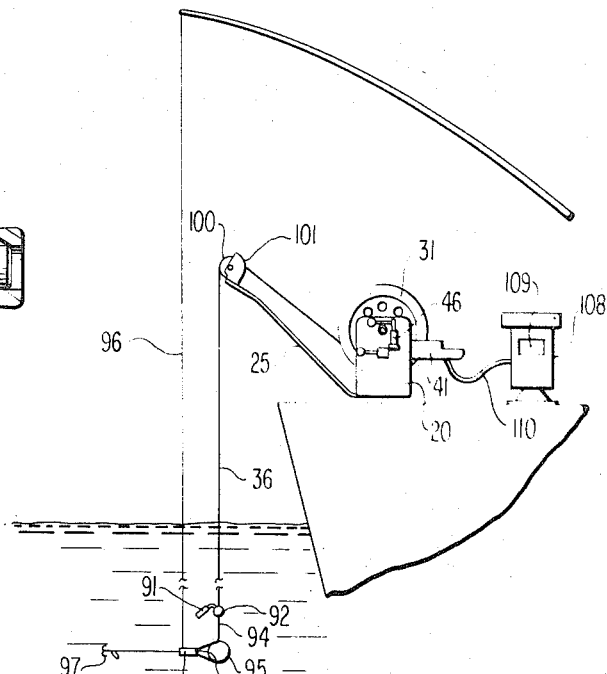
FIG. 1 is a partly diagrammatic side elevation of a deep trolling reel embodying the invention in association with a monitoring thermocline meter and a releasable fishing line.

Referring to the drawings in detail, the numeral 20 designates a sturdy L-shaped bracket upon which the trolling reel is supported. The base flange 21 of bracket 20 is rigidly secured by screws 22 to a flat mounting plate 23 with intervening spacer strips 24 interposed between the flange 21 and mounting plate in spaced pairs so as to form between them a passageway for a guide arm 25 and underlying brace 26, to be further described.

Near its upper end, the vertical web of bracket 20 has an opening for the threaded extension 27 of a reel supporting shaft 28 which extends at right angles beyond one side of the bracket vertical web. This shaft has a shoulder 29 which abuts the interior face of the bracket while a clamping nut 30 on the threaded extension 27 abuts the outer face of the bracket and may be welded thereto for security. The reel spool 31 formed of sheet metal is journaled for rotation on the fixed shaft 28 through a hub 32 which may be welded to the radial web or disc portion 33 of the reel spool. The latter disc portion is provided with a plurality of circumferentially equidistantly spaced openings 34 which coact with a positive pin lock, to be described. The reel spool has a relatively large substantially rectangular peripheral groove 35 to accommodate 250 feet of 200 pound test preferably 0.080 inch diameter coaxial cable 36. The reel spool diameter is preferably such that approximately two feet of cable is payed out per turn of the reel spool. A reel handle 37 of convenient size is firmly secured to the reel spool on a large crank radius close to the periphery of the spool for easy operation.

The hub 32 is preferably equipped with nylon bearings 38 or the like, FIG. 4, and a suitable spacer ring 39 is intervened between the vertical web of bracket 20 and the hub to limit end play. The other end of the shaft 28 carries any suitable releasable retainer means 40 for the reel hub 32. By this construction, the reel spool is mounted for very easy and smooth low friction operation by hand.

Figure 3:
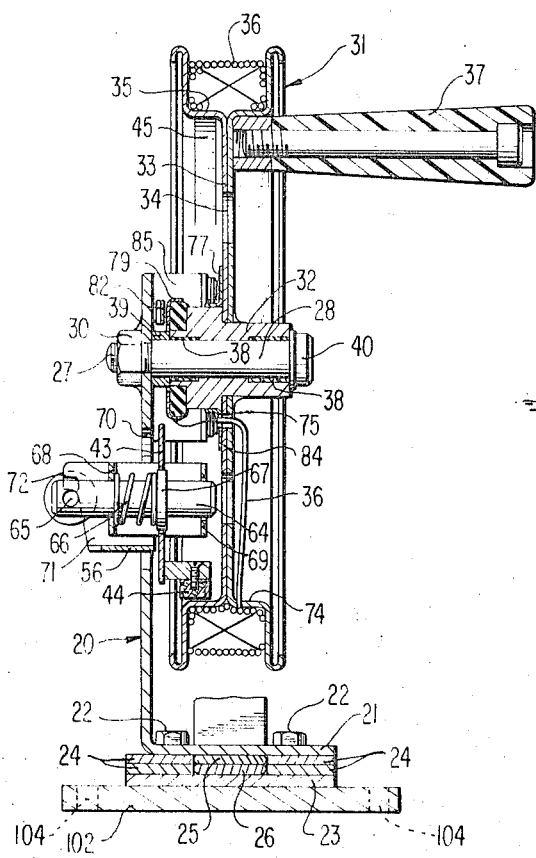
FIG. 3 is a central vertical section taken on line 3—3 of FIG. 2.
Figure 6:
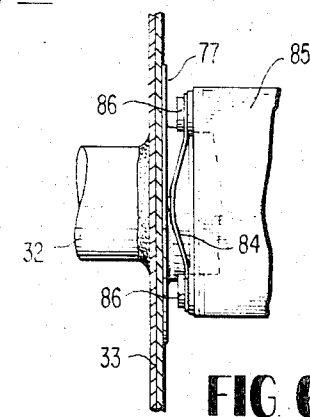
FIG. 6 is an enlarged fragmentary vertical section taken on line 6—6 of FIG. 5.
Figure 5:
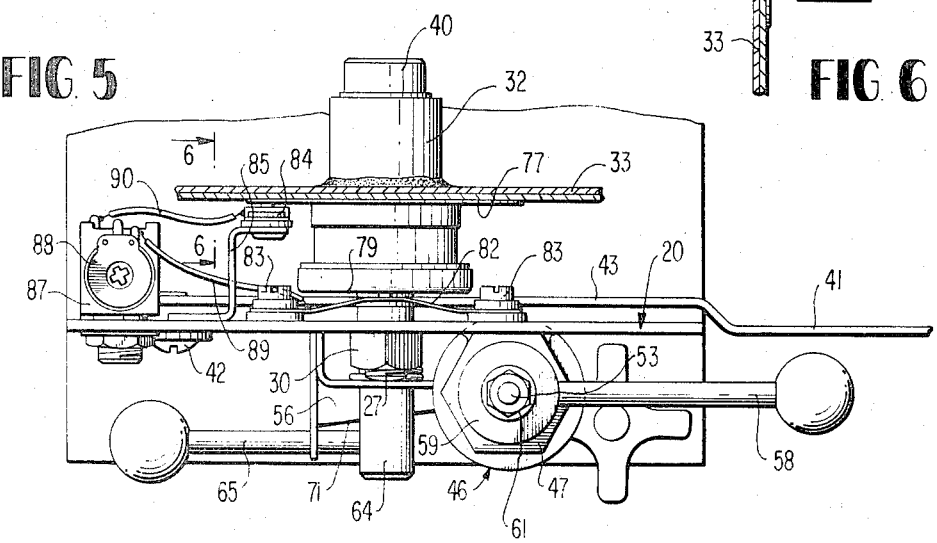
FIG. 5 is a fragmentary plan view of the reel partly in section and partly broken away.

Means to frictionally brake or retard rotation of the reel spool 31 is provided in the form of a manual brake lever 41 which is horizontal and swingable in a vertical plane around the axis of its pivotal connection at 42 with the vertical web of bracket 20, FIGS. 2 and 5. The brake lever 41 includes an offset portion 43 which extends between the bracket 20 and the reel spool, as shown best in FIG. 3. Upon its inner side, the brake lever portion 43 carries a brake shoe element 44 formed of suitable friction material and positioned to oppose the interior circumferential face 45 of the reel spool on one side of its disc portion 43.

This friction brake may be applied manually by depressing brake lever 41 or, if preferred, may be applied through an adjustable drag control assembly 46. This drag control assembly comprises a drag housing 47 preferably welded to the outer face of the vertical web of bracket 20 near the upper end thereof. The housing 47 has an internal threaded bore 48, FIG. 7, receiving a threaded drag adjusting sleeve 49 having a thumb wheel 50 at its lower end and having a spring-receiving bore 51 in its lower end leading to a reduced diameter coaxial bore 52 which receives a drag control spring stem 53 slidably. At its lower end, this stem has an enlarged head 54 adapted to contact a lateral extension plate 55 on the brake lever portion 43 and extending outwardly therefrom. Actually, this extension plate 55 as shown most clearly in FIG. 8 is formed integral with a pin lock cam 56, soon to be described in detail. A compression spring 57 contained within the bore 51 urges the stem 53 downwardly into contact with the element 55 tending to activate the brake shoe 44. The degree of drag may be adjusted to fairly wide limits by turning the thumb wheel 50 to change the tension on the spring 57. By this means, the user may dispense with the operation of the lever 41 and may preset the drag control assembly 46 to any desired degree. The drag control is so consistent or constant that the reel may be left unattended while the weighted end of the cable is descending into the water, and this frees the user for other fishing equipment duties. The drag control has another primary purpose, namely, to prevent the coaxial cable from breaking if the weight strikes the bottom or becomes snagged.

The drag control assembly 46 has another convenient feature in the form of a quick off-and-on operating lever 58 projecting radially from a cam 59 which is rotatably mounted on the upper portion of spring stem 53. This cam has an inclined lower end face 60 in opposing relation to an upper face of like inclination on the drag housing 47. A retaining nut 61 on the upper threaded end of stem 53 resists upward displacement of the cam 59 when the latter is turned relative to the fixed housing 47. Rotation of the cam 59 by means of the handle 58 for a full 180° between the positions illustrated in FIG. 7 will cause raising and lowering of the stem 53 between full off and full on positions for the drag control assembly. Thus, the user after regulating the degree of drag by use of the thumb wheel 50 can quickly adjust the drag between off and on conditions by means of the cam operating lever or handle 58. Preferably, the cam 59 is equipped with a simple spring-urged detent pin 62 which projects below the bottom of the inclined cam face to enter detent recesses 63 in the top face of the housing 47 defining the off and on drag positions. FIG. 7 shows the full on position of the drag in full lines and the full off or retracted position in broken lines.

In addition to the above friction brake means, the reel is equipped with a positive pin lock feature so that a given depth may be maintained during trolling especially in rough water. This feature comprises a rotary and axially shiftable lock pin 64 which is adapted to enter selectively any of the openings 34 to positively lock the reel spool in a selected position. The pin 64 is operated by a lever 65 secured radially to the outer end portion of the pin 64 and disposed somewhat outwardly of the bracket 20. The pin 64 is parallel to the axis of the reel mounting shaft 28 and spaced below the same near the center of the vertical web of the bracket 20. The pin 64 is also perpendicular to the axis of the drag control assembly 46 whose stem 53 lies parallel to the vertical web bracket 20 and close thereto. The pin 64 is urged toward locking engagement with the disc portion 43 by an expansible spring 66 bearing on a shoulder 67 of the lock pin. The rearward end of spring 66 engages a cross web 68 of the before-mentioned pin lock cam 56 and this web has an opening to guide the lock pin 64. The lock pin is further guided by an aligned opening in a bracket element 69 which is welded or otherwise rigidly secured to the interior side of brake lever portion 43, see FIG. 3. The pin lock cam 56 is also secured by welding to the outer side of the brake lever and the vertical web of mounting bracket 20 is cut away at 70 to allow the necessary movement of the parts mounted on the brake lever.

As best shown in FIG. 8, the pin lock cam 56 is generally U-shaped and its leading edge 71 is formed obliquely for sliding contact with the lever or handle 65 of pin 64. The cam 56 has a detent notch 72 for the lever 65 in one side wall thereof and the other side of the cam has a similar notch 73 to position the lever 65 at the other end of its 180° travel. When the lever 65 is positioned at the full line illustration in FIG. 8 and is engaged with the notch 73 on the low side of the oblique cam edge 71, the lock pin 64 is in the forward-most position under influence of the spring 66 and will enter one of the openings 34 to positively lock the reel spool in a selected position. When the lever 65 is turned 180° to the position shown in FIGS. 2, 3 and 5 and in broken lines in FIG. 8, the pin 64 is in the fully retracted position and is withdrawn from the disc portion 33 having the locking openings 34. The positive pin lock feature is entirely independent in operation from the previously described friction brake and adjustable drag means, and the only fixed relationship between these two elements of the invention is that the lock pin 64 and associated parts are bodily mounted on the brake lever 41. The movement of the brake lever 41 on its pivot 42 is slight, being limited by contact of the shoe 44 with the surface 45 of the reel spool and by contact of the element 55 with the head 54 of spring stem 53.

The coaxial cable 36 emerges through a small opening 74 in the periphery of the spool close to one side of disc portion 33. The cable then extends radially inwardly close to the spool disc and is directed through a small axial opening 75 in the disc close to the hub 32 of the reel. As shown in FIG. 4, one of the two wires making up the cable 36 is electrically attached at 76 to a slip ring 77 on the adjacent face of the reel disc 33 while the other wire of the cable is electrically attached at 78 to a contact ring 79, in turn mounted on an annular insulator 80, this insulator having a snug press fit on a cylindrical extension 81 of hub 32. A first spring contact element 82 is in sliding contact with the end face of contact ring 79 and is attached to the mounting bracket 20 by a pair of screws 83 which screws are insulated from the mounting bracket in any conventional manner. A second spring contact element 84 maintains sliding contact with the slip ring 77 and is supported on a Z-shaped bracket 85 by suitable fastener elements 86 which are electrically insulated from the bracket 85. The bracket 85 is secured by welding or the like to the interior face of mounting bracket 20 as shown clearly in FIG. 5.

On the mounting bracket 20 near one upper corner thereof is mounted a conventional phone jack 87 and attached to the housing of the phone jack is a variable resistance element 88, such as a 250 ohm. resistance. A conductor 89 leads from the resistance 88 to the spring contact 82 and is suitably electrically connected therewith, another conductor 90 serving to connect electrically the phone jack with the spring contact 84.

Referring to FIG. 1, a thermistor 91, such as a 1,000 ohm. at 25° C. thermistor, is mechanically and electrically connected to the leading end of cable 36 by a clamp 92. The thermistor is preferably protected by an open-ended plastic housing 93. A swivel clip 94 is also attached to the clamp 92 for supporting a suitable weight 95. FIG. 1 also shows the regular separately supported fishing line 96 with hook and bait 97 attached by a releasable clip 98 to weight extension 99. The clip 98 may be a simple yielding clothespin-type clip which will allow the fishing line 96 to separate readily from the weight extension 99 when a fish strikes the bait during trolling.

As shown in the drawings, the coaxial cable 36 leading from the reel spool is trained over a preferably nylon pulley 100 journaled on a forked bracket 101 secured to the outer end of the previously-described guide arm 25, which arm is of springy material. The guide arm 25 provides an inertia cushion for the cable 36 in rough water. As indicated by the broken lines in FIG. 2, the arm 25 and the associated brace 26 is adjustable longitudinally on the mounting plate 23 to which it is securely clamped in any selected adjusted position by the screws 22 and base flange 21 of bracket 20. If necessary, a guide arm of a different length may be employed. Also, an extension may be provided on the guide arm 25 to support an additional pulley, not shown, whose rotational axis is at right angles to the axis of the pulley 100. This would provide for control of the cable 36 at 90° to the arm 25 either to the left or right.

The trolling reel unit also embodies a heavy duty mounting plate 102 directly beneath the plate 23 and adapted for permanent attachment to a boat deck 102', FIG. 2, as by screws 103. The permanent mounting plate 102 is provided at its four corners with screw-threaded openings 104 which receive captive anchoring screws 105 on the reel assembly located at diagonally opposite corners of the plate 23. These screws 105 have permanently attached hand knobs 106 for convenience of operation and are held captive on the plate 23 by retainer brackets 107. FIG. 9 shows diagrammatically how the arrangement of the permanent mounting plate 102 beneath the plate 23 allows mounting of the reel assembly in any of four quadrants or directions for added convenience. If necessary, suitable elevating brackets, not shown, may be used beneath the mounting plate 102 to raise the assembly.

The deep trolling reel is constructed so that it may be used in conjunction with a separately and remotely positioned thermocline meter 108 shown diagrammatically in FIG. 1. Such a meter will embody a milliammeter 109 whose dial will contain a chart indicating the type or types of game fish which are to be found in water of a definite temperature range, which range is also readable directly on the thermocline meter. Such meters per se are well known and therefore the operation of the thermocline meter 108 need not be described herein for a full understanding of the invention. Suffice it to say that a phone jack cable 110 is used to couple the phone jack 87 of the trolling reel with an identical jack on the thermocline meter 108 so that the two units are effectively electrically connected. By this means, one meter 108 can be utilized to service or monitor a number of the deep trolling reels embodying the invention and this fact constitutes an important improvement over the noted prior art where thermocline meters have formed an integral component of a trolling reel structure, thus essentially limiting the utility of the meter to a single reel.

In the use of the deep trolling reel as above described and with the same properly mounted and adjusted for greatest convenience on the deck of a boat or the like, the fishing line 96 is releasably attached to the coaxial cable 36 in the manner previously described and the fishing line and cable are lowered into the water under influence of the weight 95. The paying out of the cable 36 may be controlled manually with the friction brake lever 41 or by means of the drag control assembly 46 as fully described previously. The reel spool may be positively locked at any time in a set position by utilizing the lock pin 64, as fully described.

With the reel electrically coupled to the thermocline meter 108 as described, the fisherman can observe the dial of the meter and will know instantly when the weighted bait is positioned at the proper temperature for catching fish of a certain species or variety. The bait positioning cable 36 is coupled in a simple series circuit with the thermocline meter which contains a small battery for a source of power. As is well known, the thermistor 91 attached to the cable 36 very close to the level of the bait is a highly sensitive electrical resistor in which the resistance varies as a function of the temperature in the region in which the thermistor is placed. Therefore, very minute temperature changes in the water within the thermocline layer are sensed by the thermistor 91 and the resulting change in resistance is reflected in the circuit of the thermocline meter, whose milliammeter readout dial can be constantly observed. The fisherman will be able at an instant to reel in or pay out the cable 36 the amounts necessary to maintain the desired temperature range for a particular type of fish as reflected on the dial of the thermocline meter. He may of course lower or raise the bait and thermistor to other levels in the thermocline layer if he is interested in a different species of fish. The control resistance 88 need only be adjusted when initially calibrating the particular thermocline meter 108 with respect to a particular thermistor 91.

The invention therefore greatly increases the pleasure and efficiency of so-called control depth fishing or deep trolling. The apparatus is rugged and durable and very convenient to use in conjunction with other customary fishing tackle. Its operation is such that its use requires only a small amount of time on the part of the fisherman and does not distract him from the other tasks incident to the sport of fishing.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A deep trolling reel comprising a main mounting bracket attachable to a supporting base, a manually operable reel spool supported for rotation on said bracket, a bait positioning electrical cable connected with the reel spool and windable thereon and unwindable therefrom, a thermally sensitive resistor and weighting means electrically and mechanically coupled to said cable and adapted to be lowered into the thermocline layer of a body of water with the cable by operation of said reel spool, means for releasably attaching said resistor and weighting means to a separate fishing line, slip ring means attached to said reel spool and turning therewith, stationary electrical contact means on said main mounting bracket slidably contacting the slip ring means, said electrical cable being electrically connected with the slip ring means, an electrical connector on said mounting bracket, conductor means electrically connecting said connector and said slip ring means, whereby said cable may be electrically coupled through the connector to a remotely located thermocline meter, and friction retarding and positive locking means for the reel spool on said mounting bracket.

2. The structure of claim 1, and a mounting base for said bracket, said base having a passageway extending therethrough, a cable guide arm of resilient material including an extension engageable within said passage, means on said base to clamp the guide arm extension adjustably within said passage, and a cable guiding pulley on the leading end portion of said guide arm spaced from said reel spool.

3. The structure of claim 2, and said base comprising a first base plate attached directly to said mounting bracket, a pair of captive base mounting screws on the first base plate at diagonally opposite corners thereof, a second base plate beneath the first base plate adapted for permanent mounting on a supporting base and having four corner threaded openings, diagonally opposite pairs of said threaded openings adapted to receive said captive screws, whereby the reel may be mounted in any of four quadrants for convenience of use.

4. The structure of claim 3, and a guide arm brace underlying the guide arm and also being received adjustably within said passage of the base.

5. The structure of claim 1, and said slip ring means comprising a first slip ring on the radial disc of the reel spool and a second slip ring on the reel hub and electrically insulated therefrom, said electrical cable including a pair of conductors one of which is electrically connected to each of said slip rings, said stationary contact means comprising a pair of spring contacts one each slidably engaging said first and second slip rings, and said electrical connector including terminals and conductors connecting said terminals and said spring contacts.

6. The structure of claim 1, and said friction retarding and positive locking means comprising a friction brake lever pivoted to the main mounting bracket and having a brake shoe element thereon engageable with an annular wall of the reel spool, an adjustable spring tension drag means on the main mounting bracket having a connection with said brake lever and adjustably biasing the same toward an active retarding position relative to the reel spool, and an independently operable positive pin lock device carried by the brake lever, the radial disc portion of the reel spool having spaced openings adapted selectively to receive a locking pin of said device.

7. The structure of claim 6, and a manually operable full off and full on lever for said drag means including a rotary cam, a reciprocatory stem having a connection with the cam and shifted axially by rotation of the cam around the axis of the stem, the stem adapted to contact a part of said brake lever to activate the same, and a spring connected with said stem urging it toward said part of the brake lever.

8. The structure of claim 7, and a screw-threaded element connected with said spring to adjust the tension of the spring.

9. The structure of claim 6, and said positive pin lock device comprising a guide and support for a locking pin mounted on said brake lever, a rotary and reciprocatory pin engaging said guide and support, a spring connected with said pin and urging it toward locking engagement with any one of said spaced openings, an operating handle for said pin, and a cam face on said guide and support engaging said operating handle during rotation of the pin by the handle to retract the pin axially against the force of said spring.

10. The structure of claim 9, and detent means for said operating handle at the opposite ends of said cam face to position the operating handle in full off and full on positions in relation to said pin.

11. The structure of claim 1, and a hand crank on said reel spool projecting beyond one side thereof and said hand crank spaced radially from the rotational axis of the reel spool and disposed adjacent the annular surface of the spool on which said electrical cable is wound up.

12. The structure of claim 5, and said electrical connector comprising a phone jack, and an adjustable resistance element electrically connected between one terminal of the phone jack and one of said spring contacts.

* * * * *